July 5, 1955
I. S. EGGLESTON
2,712,377
LIVE ROLLER CONVEYOR
Filed Nov. 6, 1953
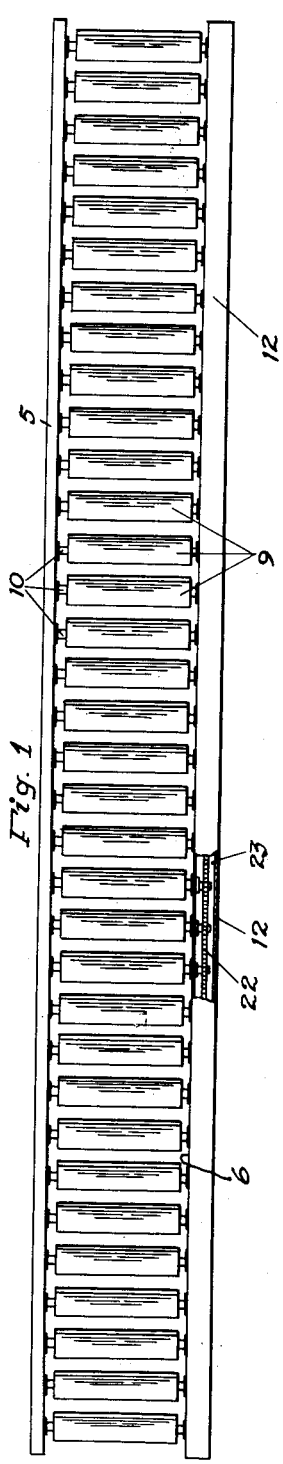
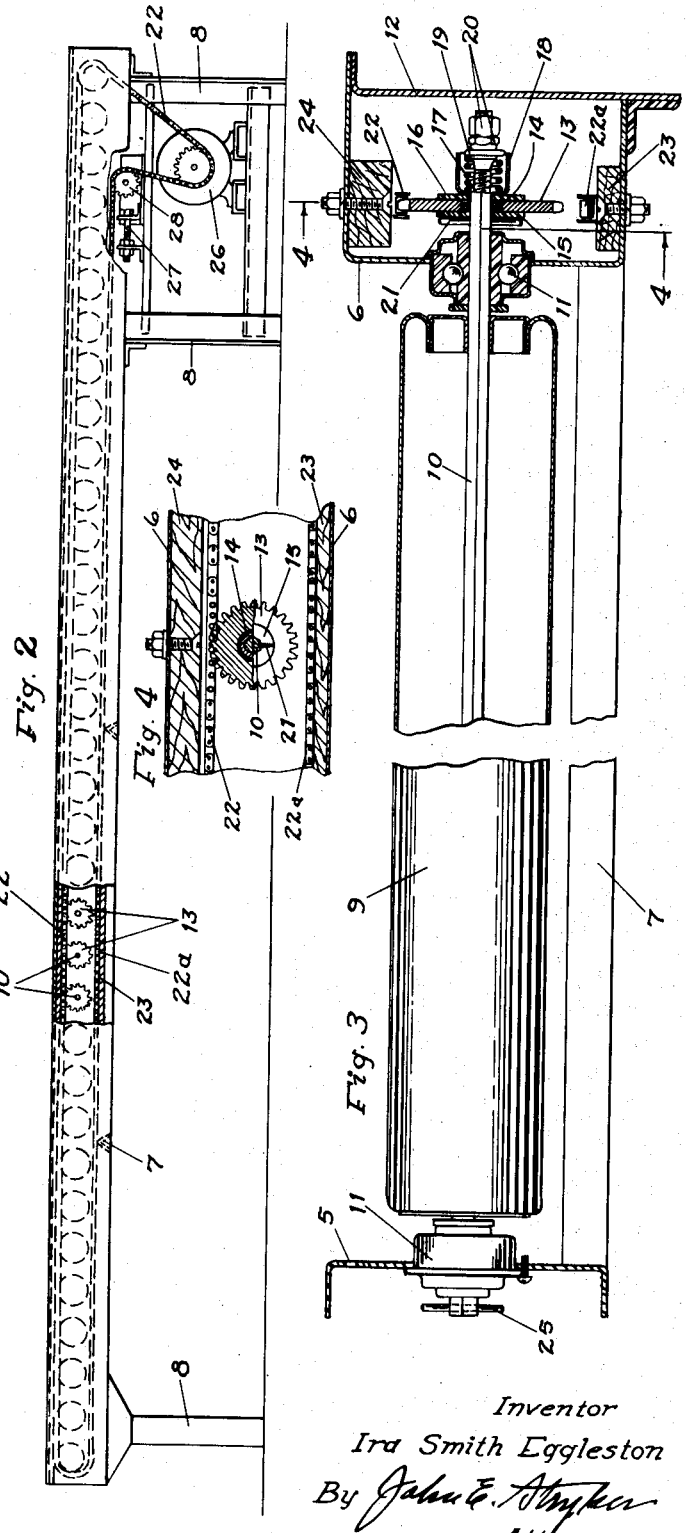
Inventor
Ira Smith Eggleston
By *John E. Stryker*
Attorney

United States Patent Office 2,712,377
Patented July 5, 1955

2,712,377

LIVE ROLLER CONVEYOR

Ira Smith Eggleston, St. Paul, Minn., assignor to Standard Conveyor Company, North St. Paul, Minn., a corporation of Minnesota Application November 6, 1953, Serial No. 390,670

3 Claims. (Cl. 198—127)

This invention relates to conveyors of the live roller type having a multiplicity of rollers adapted to carry load units on their upper peripheries and arranged to define either a substantially horizontally extending path or a slightly inclined path along which the load units may be moved by power applied to the several rollers, and particularly to a conveyor of this type wherein the rotation of the several load supporting rollers may be interrupted, accelerated or retarded by relatively slight force applied either directly to the individual rollers or to the load units supported thereon.

The principal object of my invention is to provide unusually simple and efficient friction driving means for each of several rollers including an axially disposed shaft supporting each roller in fixed driving relation thereto and a rotary driving member, e. g., a sprocket wheel or gear, revolubly mounted on the axial shaft and friction driving means interposed between the shaft and driving member whereby a limited and adjustable torque may be transmitted to each roller from a positively driven sprocket wheel or gear mounted on the axial roller shaft.

The invention also includes certain other novel features of construction which will be particularly pointed out and described in the following specification and claims.

My improved conveyor is particularly adapted for use where the load units to be conveyed accumulate on the conveyor or are retarded individually thereon, or where movement of the load units is to be arrested without stopping the entire conveyor. Injury to workmen or operators of conventional live roller conveyors has occurred heretofore when the hands or clothing of attendant operators or workmen have become caught between positively driven rollers or between a roller and its driving belt, or between a roller and the conveyor frame, or otherwise because such rollers cannot be stopped in time to prevent injuries. The present conveyor eliminates these and other disadvantages of positively driven rollers by permitting any roller or group of rollers to be retarded or stopped when the load unit or units supported thereon are retarded or stopped thereon or when relatively slight retarding force is applied to any individual roller manually or otherwise. It also permits independent acceleration of the rollers and load units carried thereby.

Heretofore the rollers of conveyors of this general type have been frictionally driven through radial load carrying bearings located between the rollers and their supporting shafts and the several individual supporting shafts have been positively driven so that the torque has been transmitted from each shaft to the roller carried thereby through a friction type radial load carrying bearing. A conveyor of this type is described in Patent No. 2,602,536, granted to me July 8, 1952. Such mechanism for transmitting torque to the individual rollers operates very successfully where the conveyor can be placed substantially horizontally, but is not so satisfactory in situations where the conveyor is required to raise loads along a substantially inclined path or in some other situations because of the lack of control of the frictional torque and dependence on the weight of the load as a major factor of the torque transmitted to the rollers. By the present invention I overcome this difficulty by providing mechanism which is adjustable to regulate the torque transmitted to each roller independently of the weight of the load units to be conveyed and whereby the torque may be increased within safe limits while retaining the advantages of a friction drive for each roller.

Referring to the accompanying drawing which illustrates, by way of example and not for the purpose of limitation, a preferred embodiment of my invention:

Figure 1 is a top plan view of one of my improved conveyors with a portion of the casing of the drive mechanism broken away to show parts otherwise concealed;

Fig. 2 is a side elevational view of the same with a portion of the casing broken away;

Fig. 3 is a part cross sectional view and part elevational view showing one of the rollers and the supporting members and driving mechanism for the roller, and Fig. 4 is a cross sectional view taken on the line 4—4 of Fig. 3.

My improved conveyor has spaced parallel side rails indicated by the numerals 5 and 6 respectively. These rails are rigidly connected together at suitable intervals by cross frame members 7 and the conveyor, as a unit, is supported on legs 8 so that the rails 5 and 6 extend either substantially horizontally or at a slight incline. A multiplicity of rollers 9 are disposed crosswise between the rails 5 and 6 to define the path along which the load units may be moved.

Extending axially through each of the rollers 9 is a supporting shaft 10 which is preferably of non-circular shape in cross section, e. g., of hexagonal shape. Each of the rollers 9 is fixed on one of the shafts 10 and anti-friction bearings, indicated generally by the numeral 11, are interposed between each of the shafts 10 and the rails 5 and 6 so that the load carried by the roller is transmitted through these anti-friction bearings to the supporting rails and conveyor frame.

My improved driving mechanism for the rollers is contained in a casing indicated generally by the numeral 12. Mounted on an end portion of the shaft 10 within the casing 12 is a driving member comprising a sprocket wheel 13 and interposed between this sprocket wheel and the shaft 10 is a bearing member 14 upon which the sprocket wheel is rotatable. It will be evident that a spur gear or other suitable rotary driving member may be substituted for the sprocket wheel 13. Friction driving disks 15 and 16 are disposed to engage opposite faces of the sprocket wheel 13 and are held in frictional engagement therewith by a coiled spring 17 contained in a cup 18. Pressure is applied to the outer end of the spring 17 by means of a thrust collar 19 and a pair of lock nuts 20 which are threaded on an end portion of the shaft 10. Projecting from the shaft 10 adjacent to the disk 15 is a thrust pin 21 which limits movement of the friction drive mechanism toward the adjacent bearing 11 and also confines the roller on the shaft. Tension of the spring 17 and resulting pressure applied to the friction disks and sprocket wheel is adjustable by means of the lock nuts 20.

As shown, an endless chain 22 is provided to drive the several rollers. This chain has an upper reach extending tangentially to the several sprocket wheels 13 in engagement with their upper peripheries and has a lower reach 22a slidably supported on a bearing guide bar 23. The upper reach of the chain 22 is confined in engagement with the sprocket wheels by a bar 24 extending horizontally above it. To confine each shaft 10 against substantial longitudinal movement in its bearings 11 toward the pin 21, a second pin 25 projects from a cross bore in the shaft near its end remote from the friction drive mechanism. As shown in Fig. 2, the chain 22 may be driven through suitable connections with an electric motor 26 and the tension in the chain may be adjusted by suitable tensioning mechanism indicated generally by the numeral 27 and arranged to actuate an idler sprocket wheel 28.

In operation, the endless chain 22 may be operated at a suitable speed through its connection with the motor 26, the latter being provided with suitable controls, not shown. Since the chain is in continuous engagement with the upper peripheries of the several sprocket wheels 13, the latter are positively and continuously driven in unison during the conveyor operation. Torque for turning the several rollers 9 is transmitted to each of them through a pair of the friction disks 15 and 16 engaging opposite faces of sprocket wheel 13 under the pressure exerted by the coiled spring 17, the friction disks being confined between the pin 21 and cup 18 containing the spring. By adjusting the positions of the lock nuts 20 on threaded end portion of the shaft, the pressure exerted by the spring may be adjusted to meet the needs of each installation. It will thus be apparent that torque sufficient to turn each roller when under load is transmitted thereto so that the load units are moved along the path defined by the rollers 10. This torque is substantially independent of the radial load which is carried on the anti-friction bearings 11.

Advance of the load units along the conveyor may be interrupted or retarded at any time by the application of relatively slight retarding force. Thus rotation of any load supporting roller may be stopped when a load unit in contact therewith is stopped without interrupting the operation of the remaining portions of the conveyor and any load unit or group of units may be accelerated along the conveyor by force applied manually to the units. Danger of injury to the operators handling the load units is eliminated by permitting the several rollers to be stopped independently of the others by the application of relatively slight retarding force.

I claim:

1. In a conveyor having a frame, a multiplicity of load supporting rollers disposed to carry loads on their upper peripheries, axially disposed shafts severally supporting said rollers in fixed driving relation thereto, and anti-friction bearings interposed between said shafts and said frame; an improved friction driving mechanism for each of said rollers comprising, a sprocket wheel revolubly mounted on the shaft supporting the roller, a disk fixed against rotation on said shaft and disposed to frictionally engage said sprocket wheel, a pin projecting from said shaft to limit movement of said sprocket wheel along said shaft, a coiled spring embracing said shaft and disposed to cause said disk to frictionally engage the sprocket wheel and lock nuts threaded on an end portion of the shaft and adjustably confining the spring thereon.

2. In a live roller conveyor having a plurality of load supporting rollers disposed to carry loads on their upper peripheries, axially disposed shafts severally supporting said rollers in fixed driving relation thereto, rotary driving members revolubly mounted on the several shafts for operatively connecting the driving members to the several shafts, an end thrust bearing at one side of the driving member for each shaft, a nut threaded on each of said shafts at the side opposite the driving member thereon, and spring means disposed to be compressed by operation of said nuts for biasing the several clutches toward driving relation with the respective shafts and driving members, the force exerted by said springs for creating frictional driving force being adjustable by operation of said nuts.

3. In a live roller conveyor having a plurality of load supporting rollers disposed to carry loads on their upper peripheries, axially disposed shafts severally supporting said rollers in fixed driving relation thereto, rotary driving members revolubly mounted on the several shafts, friction clutches carried by the several shafts for operatively connecting the driving members to the several shafts, an end thrust bearing at one side of the driving member for each shaft, a nut threaded on each of said shafts at the side opposite the driving member thereon, spring means disposed to be compressed by operation of said nuts for biasing the several clutches toward driving relation with the respective shafts and driving members, the force exerted by said springs for creating frictional driving force being adjustable by operation of said nuts, and power means operatively connected to the several driving members for turning the same in unison.

References Cited in the file of this patent
UNITED STATES PATENTS

| | | |
|---|---|---|
| 1,821,617 | Cone | Sept. 1, 1931 |
| 2,464,919 | Carroll | Mar. 22, 1949 |
| 2,602,536 | Eggleston | July 8, 1952 |